(No Model.)
D. WISE.
FILTER.
No. 386,909. Patented July 31, 1888.
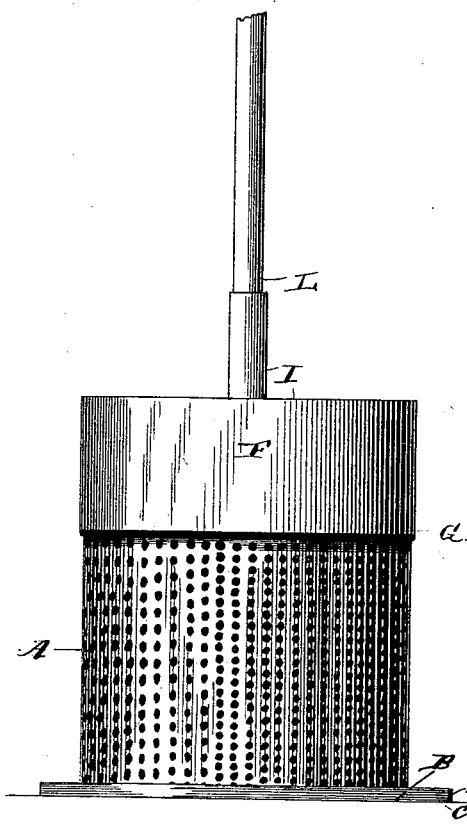
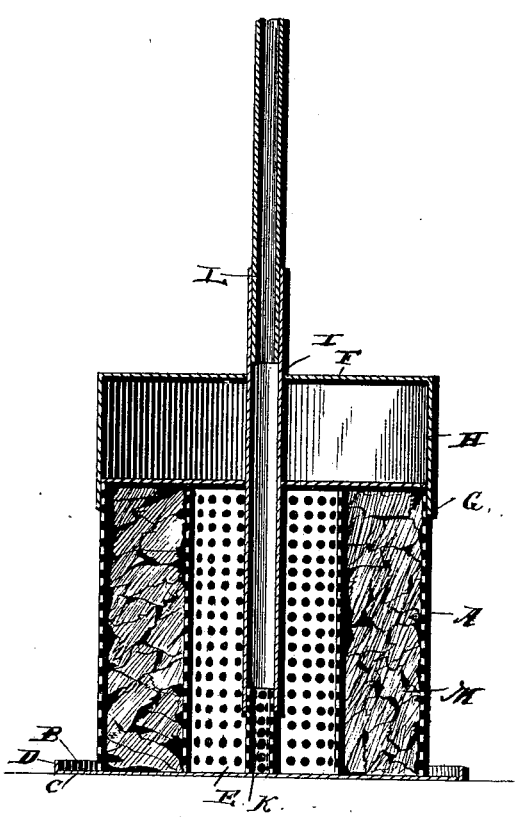
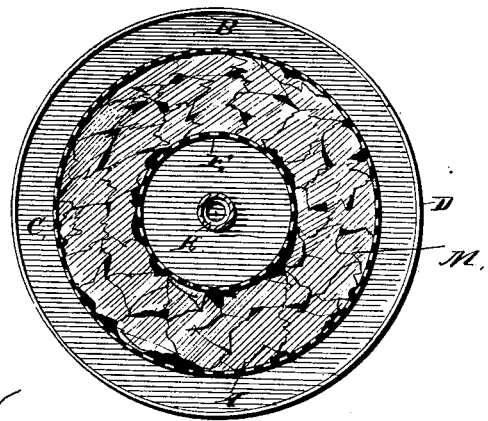
Witnesses
Geo. G. —
C. E. Doyle.
Inventor,
David Wise.
By his Attorneys,

UNITED STATES PATENT OFFICE.

DAVID WISE, OF ASHLAND, OHIO.

FILTER.

SPECIFICATION forming part of Letters Patent No. 386,909, dated July 31, 1888.

Application filed April 3, 1888. Serial No. 269,415. (No model.)

*To all whom it may concern:*

Be it known that I, DAVID WISE, a citizen of the United States, residing at Ashland, in the county of Ashland and State of Ohio, have invented new and useful Improvements in Filters, of which the following is a specification.

My invention relates to improvements in filters adapted especially for use on the ends of feed-pipes for pumps for elevating water into tanks, &c.; and it consists in a certain novel construction and arrangement of devices fully set forth hereinafter in connection with the accompanying drawings, wherein—

Figure 1 is a side view of the improved filter. Fig. 2 is a central vertical sectional view thereof. Fig. 3 is a plan view with the cap removed.

Referring to the drawings, A designates the outer perforated or porous cylinder, which is provided with the solid bottom B, and around the lower edge of the said cylinder is arranged an outstanding flange, C, having an upturned lip, D, at its outer edge. This flange and lip may be and are preferably formed integral with the bottom of the cylinder. Within the outer cylinder is arranged an inner perforated or porous cylinder, E, the upper edge of which is flush with the upper edge of the outer cylinder, and a hollow cap, F, fits down tightly on the upper edges of the said cylinders, and is provided with a depending flange, G, to engage the upper edge of the outer cylinder to hold the cap in place. This cap contains an air-tight air-chamber, H, through which passes the tube I, which passes down into the inner cylinder, as shown in the drawings. This tube is out of communication with the said air-chamber, and to its upper end is attached the pliable hose or pipe L, which conducts the filtered water to the pump.

The lower end of the tube I fits tightly over a short perforated tube, K, which is arranged at the bottom of the inner chamber or cylinder, and is open at its upper end.

The space between the outer cylinder and the inner cylinder is preferably filled with charcoal or other filtering material, as seen in the drawings at M.

The operation of the device is as follows: The air chamber in the cap holds the filter above the bottom of the water, but the bottom of the filter (which, being solid, is somewhat heavy) holds the filter below the surface of the water. The water passes through the outer cylinder, through the filtering material contained therein, through the inner cylinder, and through the perforated tube into the feed-tube K.

It will be observed that the water cannot pass through the bottom of the filter, and hence there can be no direct vertical current to agitate the sediment at the bottom of the water, and the outstanding flange around the lower end of the filter, having the upturned lip, causes all the water which enters the filter to move horizontally thereto from all sides. This flange prevents the water from being drawn upward.

A further advantage of this filter is that the purified water is collected in the interior reservoir, (within the inner cylinder,) whereby the suction of the pump is prevented from acting directly on the water on the outside of the filter, as this is liable to cause the water to pass through only a small portion of the filtering medium, and thus rapidly choke the same. The water passes into the improved filter from all sides and equally through all parts of the sides.

The sides of the filter (and especially of the outer cylinder) may be made of any porous material, as fabric, wire-gauze, &c. The bottom may be made of earthenware, and the cap may be made of any buoyant material, as cork, wood, &c.

Having thus described my invention, I claim—

The improved filter herein described and shown, comprising the outer porous cylinder, A, having a solid bottom, B, the said bottom having an integral outstanding flange, C, projecting beyond the cylinder, and the upstanding lip D, arranged concentrically with the cylinder, the inner porous cylinder arranged on the bottom concentric with the outer cylinder, its upper edge being flush with the upper edge of the outer cylinder, the filtering material placed between the said cylinders, the cap F, having an air-chamber, H, resting on the upper edges of the cylinders and provided with a depending flange, G, fitting around the upper edge of the outer cylinder, thereby securing the cap in place, the rigid imperforate tube passing vertically through the air-chamber in the cap but not communicating therewith and depending within the inner cylinder, the perforated tube K, arranged at the center of the bottom B and secured to the lower end of the rigid tube, and the flexible tube secured to the upper end of the rigid tube, substantially as specified.

In testimony that I claim the foregoing as my own I have hereto affixed my signature in presence of two witnesses.

DAVID WISE.

Witnesses:
ALBERT LUCAS,
JAMES L. BISHOP.